Nov. 9, 1971 W. V. CHERY 3,618,423
TRANSMISSION
Filed June 8, 1970

INVENTOR.
WALTER VALDEMAR CHERY
BY
Charles L. Lovendahl
attorney

United States Patent Office 3,618,423
Patented Nov. 9, 1971

3,618,423
TRANSMISSION
Walter V. Chery, 744 Alden St., Meadville, Pa. 16335
Continuation-in-part of applications Ser. No. 662,397, Aug. 22, 1967, and Ser. No. 727,937, May 9, 1968, now Patent No. 3,516,305. This application June 8, 1970, Ser. No. 44,570
Int. Cl. F16h 15/50, 47/08
U.S. Cl. 74—688     22 Claims

ABSTRACT OF THE DISCLOSURE

A planetary friction type torque converter in combination with an overrunning clutch and a set of planetary gears. The combination results in a wide continuous multiplication of speed range between output and input.

---

This application is a continuation-in-part of patent application, Ser. No. 727,937, filed May 9, 1968 and Ser. No. 662,397, filed Aug. 22, 1967.

This application constitutes an improvement over the said prior application and is especially adapted for use in vehicles where a wide torque multiplication and speed range is required at a constant horsepower. The full horsepower is utilized practically during the entire acceleration periods and, therefore, efficiency is improved to the point where required horsepower can be reduced by approximately thirty (30%) percent for the same vehicle. The above is accomplished using a combination of a friction planetary drive, an overrunning clutch and a set of planetary gears.

An object of the invention is to provide a drive wherein the wear of rolling elements is reduced to a minimum because of the nature of the drive in combination with the planetary gear assembly.

Another object of the invention is to provide a combination planetary gear and planetary friction drive assembly which is simple in construction, economical to manufacture and no hydraulic control is required and manufacturing cost is low.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
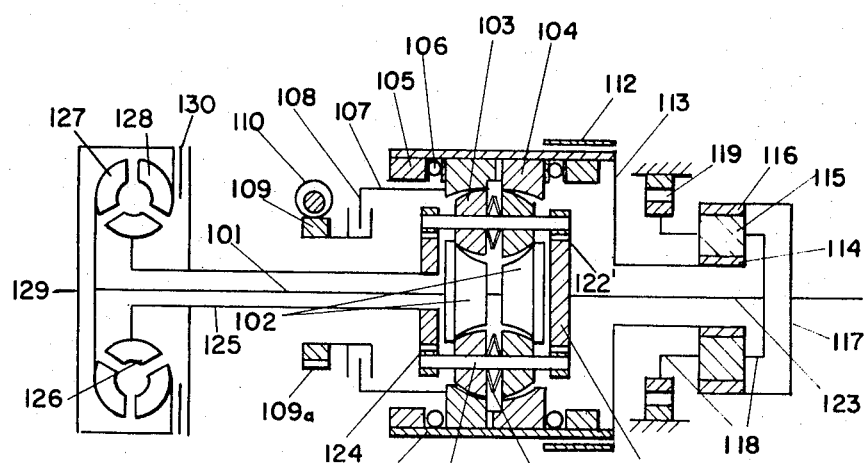
FIG. 1 is a diagrammatic view of one embodiment of the invention.
Figure 1C:
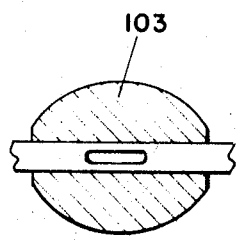
Figure 1A:
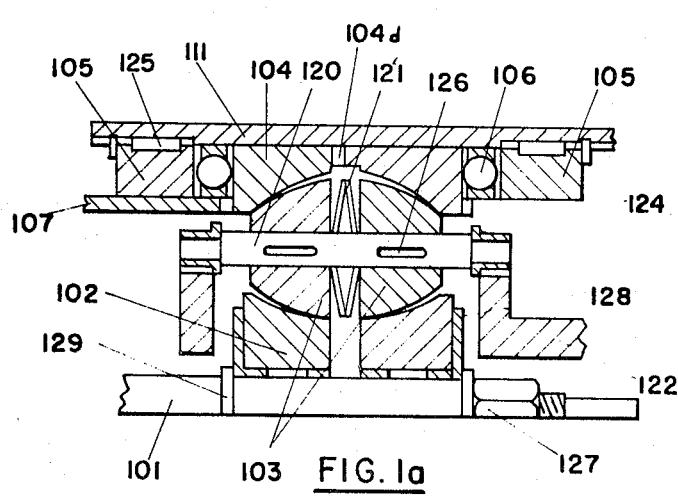
Figure 1B:
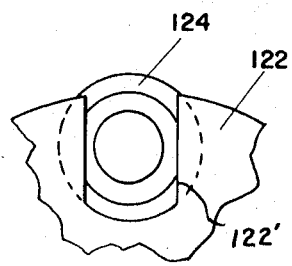

FIGS. 1a, 1b, and 1c are detailed views of parts of the embodiment shown in FIG. 1.

Now with more particular reference to FIG. 1 of the drawings wherein a transmission is shown which provides a high torque multiplication range suitable for use as a transmission in trucks, mining and earth moving equipment. The friction planetary unit is similar to that shown in the parent application and consists of sun rolls 102 which are keyed or splined to the input shaft 101. Planetary rolls 103 are urged apart by preload springs 121 which are shown as Belleville type. The planetary rolls 103 slide apart on planetary pinions 120 and are keyed to the pinions but can slide on them. The planetary pinion shafts 120 are received in radially extending bearing type bushings 124, as more particularly shown in FIG. 1b, which can slide radially in the slots 122′ of planetary cage 122 as it is shown on FIG. 1b.

Outer rings 104 are free in the housing 111 and have cam portions and are held in position by ball or roller cams 105, which are keyed to the housing 111. Planetary rolling elements 102, 103, and 104 have spherical surfaces at contact points with a radius on sun rolls 102 and outer rings 104 larger than on planetary rolls 103. The housing 111 of the friction planetary assembly is connected to sun gear 114. Planetary cage 122 through shaft 123 is connected to the planetary cage 118 of the planetary gear assembly. The planetary gear assembly has gears 114, 115, and 116. Ring gear 116 is connected to the output shaft 117. Planetary cage 118 is also connected to overrunning clutch 119. The overrunning clutch can be any of the well known kind sometimes referred to as free wheeling clutches.

Outer rings 104 are interconnected by the solid type clutch portions 104a and can slide inward and outward only in relation to each other. One of rings 104 is connected through part 107 to a clutch 108 which in turn is connected to a ring gear 109. The input shaft 101 is connected to an engine through a hydraulic torque converter in a conventional manner by members 127, 128, 129 and planetary cage 122 to its stator by member 125.

During an acceleration when a torque at output ring 116 is greater than a torque of input sun rolls 102, planetary cage 118 and 122 will be held stationary against overrunning clutch 119 by a stator 126 of a hydraulic torque converter. Meanwhile sun rolls 102 will move ring gears 104 in relation to cams 105 and outer rings 104 will be forced inward until the required ratio is obtained. At that moment a multiplied torque from outer rings 104 will be transmitted to sun gear 114 and further multiplied at ring gear 116. At the end of acceleration, when balance of forces between the torque at ring gear 116 and torque at sun rolls 102 occurs, the friction drive unit and the planetary gear set will rotate as a unit.

During downhill coasting the band 112 and clutch 108 are applied and housing 111 and sun gear 114 are held stationary. In this case, power from a ring gear 116 flows through planet gears 115, planetary cages 118 and 122, planet rollers 103, sun rolls 102, and shaft 101 to an engine. By turning worm 110 (or other means) through a ring 109, the outer rings 104 can be turned in relation to cams 105 (which are stationary now) and a desired coasting ratio can be obtained.

Figure 2:
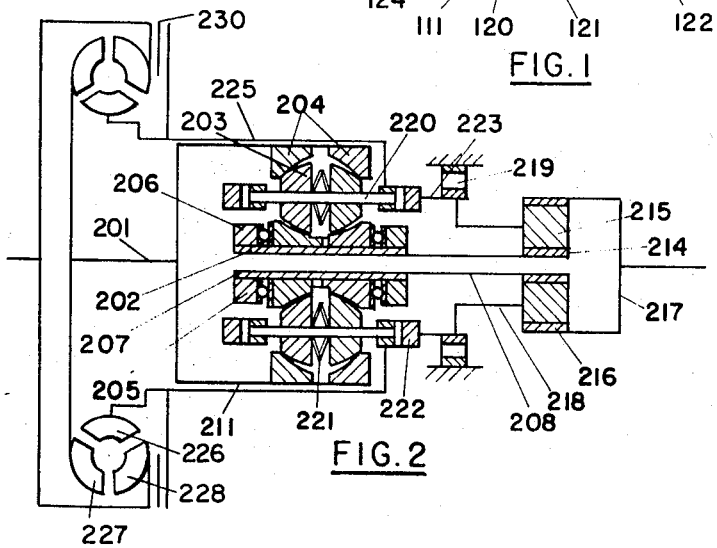
FIG. 2 is a diagrammatic view of another embodiment of the invention.

FIG. 2 shows an arrangement for use where a high torque multiplication range is not required; for example, for use in passenger vehicles.

In this case, outer rings 204 are connected to the input 201, and sun rolls 202 are connected through cams 205 and 206 to sun gear 214. Sun rolls 202 are interconnected, free to slide toward and away from each other on the shaft 207. Cams 205 and 206 are keyed or splined to shaft 207.

The connection to a hydraulic torque converter is similar to FIG. 1—input shaft 201 is connected to output and planetary cage 222 to a stator of a hydraulic torque converter.

The function of the unit is similar to the function of the unit shown in FIG. 1 except the downhill coasting arrangement is omitted.

In the embodiment of the invention shown in FIG. 1a an assembly similar to FIG. 1 is shown wherein Belleville springs 128 are constant load springs, compressed flat. They are used to control an initial preload and simplify an assembly.

When preload springs 121, FIG. 1, are removed and planet rolls are in solid contact with each other, or replaced by one solid roll 103, as shown in FIG. 1c, the Belleville springs 128, FIG. 1a, and cams 105 and 106 are used to control torque multiplication. In this case, the unit functions in the same manner, except the individual preload on planet rollers is lost and a capacity is reduced greatly.

FIG. 1 shows the rolling elements in the position they occupy corresponding to "high gear" and FIG. 1a shows a position corresponding to low gear.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A transmission comprising a shaft,
    spaced sun wheels non-rotatably supported on said shaft,
    spaced outer rings disposed generally concentric to said shaft and said sun wheels,
    planetary rolling elements,
    resilient means between said planetary rolling elements urging said planetary rolling elements apart,
    cam means urging said outer rings toward each other,
    a planetary cage disposed generally concentric to said shaft and extending between said rings and said sun wheels,
    said planetary rolling elements being supported on said planetary cage,
    said outer rings each having an internal peripheral surface inclined radially outward and toward the other of said outer rings,
    each said sun wheel having an outside peripheral surface inclining radially outward and away from the other said sun wheel,
    and said planetary rolling elements in said planetary cage engaging said inclined surfaces of said outer rings and said sun members and being preloaded by a force exerted by said resilient means between said planetary rolling elements,
    and said cam means being adapted to urge said outer rings toward said planetary roller members in proportion to the torsional force exerted by said transmission,
    and a one-way brake connecting said planetary cage to means fixed against rotation relative to said planetary cage.

2. The combination recited in claim 1 wherein a hydraulic torque converter is provided and having a first element and a second element, said first element of said torque converter is connected to said sun members,
    and said second element of said torque converter is connected to said planetary assembly.

3. The combination recited in claim 1 wherein a hydraulic torque converter is provided having a first element and a second element,
    said first element is connected to said reaction members and said second element is connected to said planetary gear set.

4. The combination recited in claim 1 wherein resilient means is provided between said planet members urging said planet members apart.

5. The combination recited in claim 2 wherein resilient means is provided between said planet members urging said planet members apart.

6. The combination recited in claim 1 wherein resilient means is provided on said input shaft urging said sun members together.

7. The combination recited in claim 2 wherein resilient means is provided on said input shaft urging said sun members together.

8. The combination recited in claim 1 wherein means is provided on said planetary assembly to allow said planet members to move toward and away from said input shaft,
    said planet members being restrained from moving circumferentially relative to said planetary assembly,
    and an out-put member connected to said planetary assembly.

9. The combination recited in claim 2 wherein means is provided on said planetary assembly to allow said said planet members to move toward and away from said input shaft,
    said planet members being restrained from moving circumferentially relative to said planetary assembly,
    and an output member connected to said planetary assembly.

10. The combination recited in claim 1 wherein said planetary assembly comprises a planetary cage having two spaced members,
    planet shafts supported on said spaced members,
    and said planet rollers disposed on said planet shafts.

11. The combination recited in claim 2 wherein said planetary assembly comprises a planetary cage having two spaced members,
    planet shafts supported on said spaced members,
    and said planet rollers disposed on said planet shafts.

12. The combination recited in claim 1 wherein said cam means comprises cam members on said reaction members,
    said cam means facing cam means supported on said transmission.

13. The combination recited in claim 2 wherein said cam means comprises cam members on said recaction members,
    said cam means facing cam means supported on said transmission.

14. The combination recited in claim 1 wherein said planetary assembly comprises a cage member made up of a single member supported on said input shaft,
    said planet rollers being disposed on each side of said cage.

15. The combination recited in claim 2 wherein said planetary assembly comprises a cage member made up of a single member supported on said input shaft,
    said planet rollers being disposed on each side of said cage.

16. The combination recited in claim 1 wherein said planet members are in the form of a single member disposed between axially spaced said planet members.

17. The combination recited in claim 2 wherein said planet members are in the form of a single member disposed between axially spaced said planet members.

18. The combination recited in claim 14 wherein said cam means comprises cam members on said reaction members, said cam means facing cam means supported on said transmission.

19. The combination recited in claim 15 wherein said cam means comprises cam members on said reaction members, said cam means facing cam means supported on said transmission.

20. In combination, a planetary friction type transmission having sun members and a planetary cage and ring members,
    a planetary gear set having a planetary set of gears and a sun gear and ring gear,
    and a hydraulic type torque converter having a turbine, a stator and an impeller,
    said sun members of said planetary friction type transmission being connected to said turbine of said hydraulic torque converter,
    said planetary cage of said friction type transmission also being connected to said planetary cage of said planetray gear set,
    said ring members of said planetary friction transmission being connected through said reaction cams to the sun gear of said planetary gear set,
    said ring gear of said planetary gear set being connected to an output shaft and said planetary cage of said planetary gear set being conected to a one-way brake,
    said planetary friction drive having spaced planet rollers and a resilient means disposed between said planet rollers, said planet rollers being in rolling contact with said sun members and said ring members, reaction cam rings having inwardly disposed cam portions, said ring members on said planetary friction transmission having outwardly disposed cam portions, balls between said inwardly disposed cam portions and said outwardly disposed cam portions and being in rolling contact with said inwardly disposed cam portions of reaction cam rings, means locking said reaction cam rings against rotation and said ring members being rotatable and slidable in said housing.

21. A transmission comprising a planetary type friction drive having ring members, a planetary set and sun members, a planetary gear set having a planetary cage, sun members and ring members, a hydraulic torque converter having a turbine and a stator and an impeller, said sun members of said planetary friction drive being connected to said turbine of said hydraulic torque converter, a clutch, an output shaft, a one-way brake, said planetary cage of said friction type drive being connected to said stator directly and through said clutch to said impeller of hydraulic torque converter and also being connected to said planetary cage of said planetary gear set, said sun members being connected to said turbine of said torque converter and said ring members to said gear of said planetary gear set, said ring members of said planetary gear set being connected to said output shaft and said planetary cage of said planetary gear set being connected to said one-way brake and to said planetary set of said friction transmission.

said planetary friction drive having spaced planet members and resilient means disposed between said spaced planet members, and reaction cam members urging said spaced ring members of said friction drive toward said planet members in proportion to the torque exerted on said transmission.

22. A transmission comprising a shaft, spaced sun wheels slidably and non-rotatably supported on said shaft and a housing, spaced ring members disposed generally concentric to said shaft and said sun wheels, means on said shaft urging said sun wheels toward each other, a planetary cage disposed generally concentric to said shaft and extending between said rings and said sun wheels, said ring members each having an internal peripheral surface inclined radially outward and toward the other of said ring members, each said sun wheels having an outside peripheral surface inclining radially outward and away from the other said sun wheel, and spaced planetary rolling elements in said planetary cage engaging said inclined surfaces of said ring members and said sun members, resilient means between said planetary rolling elements, said resilient means preloading said planetary rolling elements, said means on said shaft comprising cam means urging said sun wheels toward said planetary rolling elements with a force proportional to the torque on said shaft.

References Cited
UNITED STATES PATENTS

| | | | |
|---|---|---|---|
| 2,828,907 | 4/1958 | Oehrli | 74—863 X |
| 2,958,234 | 11/1960 | Oehrli | 74—865 |
| 3,516,305 | 6/1970 | Chery | 74—796 |

LEONARD HALL GERIN, Primary Examiner

U.S. Cl. X.R.

74—796